United States Patent
Lee et al.

(10) Patent No.: US 9,459,717 B2
(45) Date of Patent: Oct. 4, 2016

(54) IN-CELL TOUCH DISPLAY DEVICE

(71) Applicant: LG DISPLAY CO., LTD., Seoul (KR)

(72) Inventors: KiJeong Lee, Gumi-Si (KR);
KeukSang Kwon, Gumi-Si (KR);
SeungChul Park, Chilgok-Gun (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 14/581,310

(22) Filed: Dec. 23, 2014

(65) Prior Publication Data
US 2016/0018916 A1    Jan. 21, 2016

(30) Foreign Application Priority Data

Jul. 16, 2014   (KR) .................. 10-2014-0090038

(51) Int. Cl.
| | |
|---|---|
| G09G 3/36 | (2006.01) |
| G06F 3/044 | (2006.01) |
| G06F 3/041 | (2006.01) |
| G02F 1/1333 | (2006.01) |
| G09G 5/00 | (2006.01) |
| G09G 3/20 | (2006.01) |

(52) U.S. Cl.
CPC ........... *G06F 3/041* (2013.01); *G02F 1/13338* (2013.01); *G06F 3/044* (2013.01); *G06F 3/0412* (2013.01); *G09G 3/2092* (2013.01); *G09G 5/00* (2013.01); *G06F 2203/04112* (2013.01); *G09G 2300/0876* (2013.01); *G09G 2310/0208* (2013.01); *G09G 2310/0213* (2013.01); *G09G 2310/08* (2013.01); *G09G 2330/021* (2013.01)

(58) Field of Classification Search
CPC ................ G06F 3/0412; G06F 3/44
See application file for complete search history.

(56) References Cited

U.S. PATENT DOCUMENTS

| | | |
|---|---|---|
| 2007/0008272 A1 | 1/2007 | Li |
| 2007/0285365 A1 | 12/2007 | Lee |
| 2008/0062140 A1 | 3/2008 | Hotelling |
| 2008/0309627 A1 | 12/2008 | Hotelling |

(Continued)

FOREIGN PATENT DOCUMENTS

| | | |
|---|---|---|
| CN | 102236487 A | 11/2011 |
| CN | 102132232 B | 5/2014 |

(Continued)

OTHER PUBLICATIONS

European Patent Office, Search Report and Opinion, European Patent Application No. 14198464.1, Nov. 2, 2015, ten pages.

(Continued)

*Primary Examiner* — Lin Li
(74) *Attorney, Agent, or Firm* — Fenwick & West LLP

(57) ABSTRACT

An in-cell touch display device. A panel has a plurality of data lines, a plurality of gate lines and a plurality of touch electrodes disposed thereon. A touch driving signal is applied to the plurality of touch electrodes when a driving mode is a touch mode. A data driver drives the plurality of data lines. A gate driver drives the plurality of gate lines. The gate driver sequentially outputs a scanning signal for driving the plurality of gate lines to the plurality of gate lines when the driving mode is a display mode, and outputs a load-free driving signal corresponding to the touch driving signal to at least one gate line when the driving mode is the touch mode. A level shifter generates the load-free driving signal. A multiplexer inputs a scanning voltage or the load-free driving signal to the gate driver depending on the driving mode.

17 Claims, 8 Drawing Sheets

(56) References Cited

U.S. PATENT DOCUMENTS

| | | |
|---|---|---|
| 2009/0201231 A1 | 8/2009 | Takahara |
| 2010/0194699 A1 | 8/2010 | Chang |
| 2010/0253638 A1 | 10/2010 | Yousefpor |
| 2010/0302202 A1 | 12/2010 | Takeuchi et al. |
| 2010/0328257 A1* | 12/2010 | Noguchi .................. G06F 3/044 345/174 |
| 2011/0216039 A1* | 9/2011 | Chen ..................... G06F 3/0412 345/173 |
| 2011/0267295 A1 | 11/2011 | Noguchi |
| 2012/0056835 A1* | 3/2012 | Choo .................... G06F 3/0412 345/173 |
| 2012/0154322 A1 | 6/2012 | Yang |
| 2012/0182251 A1 | 7/2012 | Krah |
| 2012/0218482 A1 | 8/2012 | Hwang et al. |
| 2013/0127752 A1* | 5/2013 | Takeuchi ............. G06F 3/0412 345/173 |
| 2013/0215075 A1* | 8/2013 | Lee ........................ G06F 3/044 345/174 |
| 2013/0321296 A1 | 12/2013 | Lee et al. |
| 2013/0342431 A1* | 12/2013 | Saeedi ................. G09G 3/3655 345/89 |
| 2014/0022185 A1* | 1/2014 | Ribeiro ................ G06F 3/0412 345/173 |
| 2014/0062943 A1 | 3/2014 | Choi et al. |
| 2014/0132560 A1* | 5/2014 | Huang ................... G06F 3/041 345/174 |
| 2014/0152617 A1 | 6/2014 | Kida |
| 2014/0184533 A1* | 7/2014 | Park ..................... G06F 3/0412 345/173 |
| 2014/0225840 A1 | 8/2014 | Jamshidi-Roudbari |
| 2014/0232691 A1* | 8/2014 | Lee ........................ G06F 3/044 345/174 |
| 2014/0253498 A1* | 9/2014 | Suzuki .................... G06F 3/044 345/174 |
| 2014/0285466 A1 | 9/2014 | Hayashi |
| 2015/0091849 A1* | 4/2015 | Ludden ................ G06F 3/0412 345/174 |
| 2015/0177880 A1 | 6/2015 | Shin |
| 2015/0220208 A1 | 8/2015 | Noguchi et al. |

FOREIGN PATENT DOCUMENTS

| | | |
|---|---|---|
| EP | 2 333 642 A1 | 6/2011 |
| EP | 2 887 185 A1 | 6/2015 |
| JP | H04-337825 A | 11/1992 |
| JP | 2005-070337 A | 3/2005 |
| JP | 2015-164033 A | 9/2015 |
| KR | 1020080043508 A | 5/2008 |
| KR | 1020130129620 | 11/2013 |
| TW | 201229855 A | 7/2012 |

OTHER PUBLICATIONS

Japan Patent Office, Office Action, Japanese Patent Application No. 2014-258814, Dec. 8, 2015, nine page [with concise explanation of relevance in English].

United States Office Action, U.S. Appl. No. 14/863,193, Nov. 23, 2015, nineteen pages.

Office Action for Korean Patent Application No. KR 10-2014-0090038, Nov. 20, 2015, 6 Pages. (With Concise Explanation of Relevance).

Taiwan Office Action, Taiwan Application No. 103145938, Apr. 11, 2016, 9 pages (with concise explanation of relevance).

* cited by examiner

IN-CELL TOUCH DISPLAY DEVICE

CROSS REFERENCE TO RELATED APPLICATION

This application claims priority from and the benefit under 35 U.S.C. §119(a) of Korean Patent Application No. 10-2014-0090038 filed on Jul. 16, 2014, which is hereby incorporated by reference for all purposes as if fully set forth herein.

BACKGROUND OF THE INVENTION

1. Field of the Invention

The present invention relates to an in-cell touch display device.

2. Description of Related Art

In response to the development of the information society, there is an increased demand for various types of display devices able to display images. Currently, various display devices, such as liquid crystal displays (LCDs), plasma display panels (PDPs) and organic light-emitting diode (OLED) displays, are used.

Many display devices provide a touch-based input system enabling users to intuitively and conveniently input information or instructions directly to a device screen, rather than using conventional input systems, such as buttons, a keyboard and a mouse.

In order to provide such a touch-based input system, sensitivity to the touch of a user and the ability to accurately detect coordinates of a touched point are required.

For this, in the related art, touch sensing is provided using a touch sensing method selected from among a variety of touch sensing technologies, such as resistive touch sensing technology, capacitive touch sensing technology, electromagnetic induction technology, infrared (IR) touch sensing technology and ultrasonic touch sensing technology.

Among the variety of touch sensing technologies, capacitive touch sensing technology is popular. This technology uses a plurality of touch electrodes (e.g., row electrodes and column electrodes) formed on a touchscreen panel to detect a touch and coordinates of a touched point based on a change in the capacitance between touch electrodes or between a pointer, such as a finger, and a touch electrode.

According to the capacitive touch sensing technology, in addition to capacitance necessary for touch sensing, undesirable parasitic capacitance is generated by other voltage lines or electrodes surrounding touch electrodes.

The undesirable parasitic capacitance causes certain problems, for example, increasing the load of a touch operation, lowering the accuracy of touch sensing, and in severe cases, making touch sensing impossible.

The problems caused by such undesirable parasitic capacitance frequently occur in in-cell display devices inside which a touchscreen panel (TSP) is integrally provided using "in-cell" technology.

BRIEF SUMMARY OF THE INVENTION

Various aspects of the present invention provide an in-cell touch display device able to prevent parasitic capacitance that would otherwise increase the load of a touch operation, lower the accuracy of touch sensing, or make touch sensing impossible.

Also the present invention is directed to an in-cell touch display device providing an efficient gate line driving system that can prevent parasitic capacitance.

Also the present invention is directed to an in-cell touch display device able to prevent parasitic capacitance without a change in the design of existing parts, such as a gate driver and a power management integrated circuit.

In an aspect of the present invention, there is an in-cell touch display device that includes: a panel comprising a plurality of data lines, a plurality of gate lines and a plurality of touch electrodes disposed thereon, wherein a touch driving signal is applied to the plurality of touch electrodes when a driving mode is touch mode; a data driver driving the plurality of data lines; a gate driver driving the plurality of gate lines, wherein the gate driver sequentially outputs a scanning signal for driving the plurality of gate lines to the plurality of gate lines when the driving mode is display mode, and outputs a load-free driving signal corresponding to the touch driving signal to at least one gate line of the plurality of gate lines when the driving mode is the touch mode; a level shifter generating the load-free driving signal; and a multiplexer inputting a scanning voltage or the load-free driving signal to the gate driver depending on the driving mode.

According to one or more embodiments of the present invention as set forth above, the in-cell touch display device can prevent parasitic capacitance that would otherwise increase the load of the touch operation, lower the accuracy of the touch sensing, or make the touch sensing impossible.

In addition, according to one or more embodiments of the present invention, the in-cell touch display device provides an efficient gate line driving system that can prevent parasitic capacitance.

Furthermore, according to one or more embodiments of the present invention, the in-cell touch display device can prevent parasitic capacitance without a change in the design of existing parts, such as the gate driver and the power management integrated circuit.

BRIEF DESCRIPTION OF THE DRAWINGS

The above and other objects, features and advantages of the present invention will be more clearly understood from the following detailed description when taken in conjunction with the accompanying drawings, in which.

DETAILED DESCRIPTION OF THE INVENTION

Figure 1:
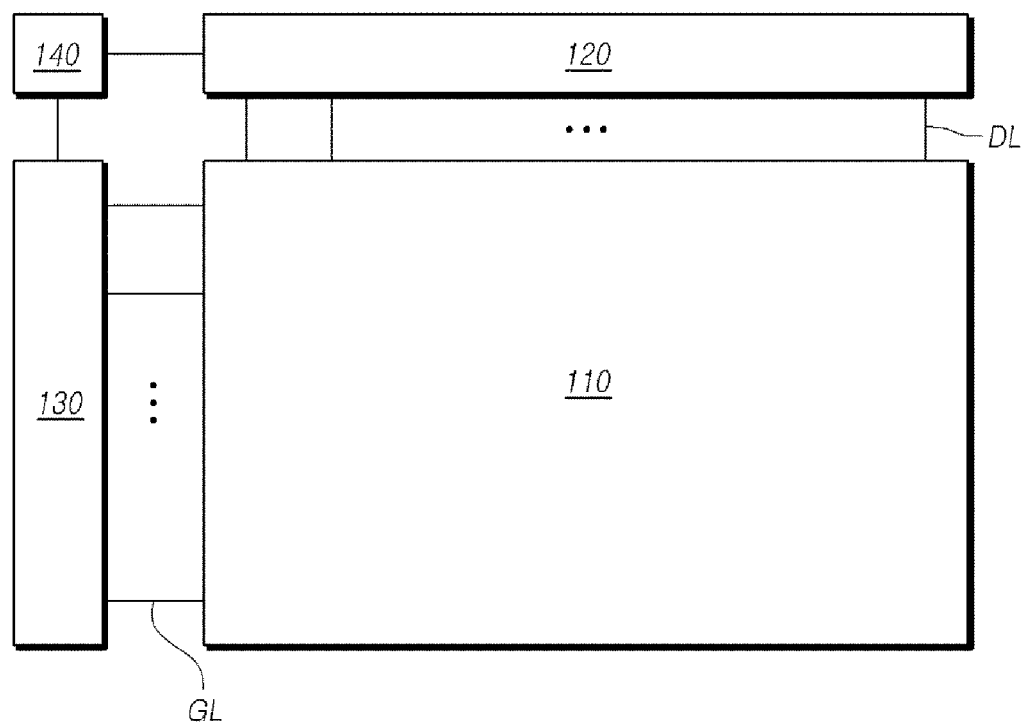
FIG. 1 is a schematic system configuration view illustrating an in-cell touch display device according to an exemplary embodiment of the present invention.

Reference will now be made in detail to the present invention, embodiments of which are illustrated in the accompanying drawings. Throughout this document, reference should be made to the drawings, in which the same reference numerals and signs may be used throughout the different drawings to designate the same or similar components. In the following description of the present invention, detailed descriptions of known functions and components incorporated herein will be omitted in the case that the subject matter of the present invention may be rendered unclear thereby.

It will also be understood that, although terms such as "first," "second," "A," "B," "(a)" and "(b)" may be used herein to describe various elements, such terms are only used to distinguish one element from another element. The substance, sequence, order or number of these elements is not limited by these terms. It will be understood that when an element is referred to as being "connected to" or "coupled to" another element, not only can it be "directly connected" or "coupled to" the other element, but also can it be "indirectly connected or coupled to" the other element via an "intervening" element. In the same context, it will be understood that when an element is referred to as being formed "on" or "under" another element, not only can it be directly formed on or under another element, but also can it be indirectly formed on or under another element via an intervening element.

FIG. 1 is a schematic system configuration view illustrating an in-cell touch display device 100 according to an exemplary embodiment of the present invention.

Referring to FIG. 1, the in-cell touch display device 100 includes a panel 110 on which a plurality of data lines DL, a plurality of gate lines GL and a plurality of touch electrodes are disposed, a data driver 120 for driving the plurality of data lines DL, a gate driver 130 for driving the plurality of gate lines GL, and a timing controller 140 for controlling the data driver 120 and the gate driver 130.

In the in-cell touch display device 100 according to an exemplary embodiment illustrated in FIG. 1, the data driver 120 may include at least one data driver integrated circuit (DDIC).

The DDIC may be connected to the bonding pads of the panel 110 by tape automated bonding (TAB) or chip-on-glass (COG) bonding, or in some cases, may be integrated with the panel 110.

In the in-cell touch display device 100 according to an exemplary embodiment illustrated in FIG. 1, the gate driver may be positioned on one side of the panel 110, as illustrated in FIG. 1. Alternatively, the gate driver may also be divided into two sections that are positioned on both sides of the panel 110 depending on the driving method.

The gate driver unit 130 may further include at least one gate driver integrated circuit (GDIC).

The GDIC may be connected to the bonding pads of the panel 110 by tape automated bonding (TAB) or chip-on-glass (COG) bonding, may be implemented as a gate-in-panel (GIP) type GDIC that is directly provided on the panel 110, or in some cases, may be integrated with the panel 110.

On the panel 110 of the in-cell touch display device 100 according to an exemplary embodiment illustrated in FIG. 1, a plurality of pixels may be formed at a plurality of points in which the plurality of data lines DL and the plurality of gate lines GL intersect each other. Here, each of the pixels may consist of three or four sub-pixels or may be a single sub-pixel.

The panel 110 of the in-cell touch display device 100 according to an exemplary embodiment illustrated in FIG. 1 can function as both a display panel and a touchscreen panel. That is, the panel 110 can function as a "display panel" in a display mode, and can function as a "touchscreen panel" in a touch mode.

In this sense, the panel 110 of the in-cell touch display device 100 according to an exemplary embodiment is referred to as "a display panel with which a touchscreen panel is integrated," "a display panel inside which a touchscreen panel is provided," or "an in-cell touchscreen display panel."

With the plurality of touch electrodes disposed on the panel 110 of the in-cell touch display device 100 according to an exemplary embodiment, the panel 110 can function as a touchscreen panel.

The "plurality of touch electrodes" may be "touch mode electrodes" to which a touch signal is applied only when the driving mode of the display device is a touch mode, or may be "common mode electrodes" to which a display driving signal (e.g. a common voltage) is applied in a display mode and a touch driving signal (TDS) is applied in a touch mode.

When the plurality of touch electrodes are the common mode electrodes, for example, a plurality of common electrodes (CEs) formed as blocks on the panel 110 can be used as a plurality of touch electrodes. That is, the plurality of touch electrodes can be a plurality of common electrodes to which the common voltage Vcom is applied. Here, the common voltage Vcom refers to a voltage that must be supplied to all pixels for the purpose of displaying an image.

In this case, the plurality of touch electrodes corresponding to the plurality of common electrodes formed as blocks on the panel 110 have the common voltage applied thereto as a display driving signal when the driving mode of the display device is display mode, and have at least one touch driving signal applied thereto when the driving mode of the display device is a touch mode.

In this regard, in an example, when the in-cell touch display device 100 is a liquid crystal display (LCD), the plurality of common electrodes formed as blocks on the panel 110 may be a plurality of common electrodes to which the common voltage Vcom is applied in order to form an electric field corresponding to each of pixel electrodes to which a pixel voltage is applied.

In another example, when the in-cell touch display device 100 is an organic light-emitting diode (OLED) display, the plurality of common electrodes formed as blocks on the panel 110 are the cathode electrodes (common electrodes) of a plurality of organic light-emitting diodes (OLEDs) corresponding to the anode electrodes (pixel electrodes) of the plurality of OLEDs. In the following, for the sake of explanation, it will be illustrated that the touch electrodes are formed as the common mode electrodes to which a corresponding signal is applied in either display mode or touch mode and that the common electrodes to which the common voltage Vcom is applied for the purpose of displaying an image function as touch electrodes. Therefore, the touch electrodes will be referred to hereinafter as the common electrodes.

The plurality of common electrodes formed on the panel 110 of the in-cell touch display device 100 according to an exemplary embodiment are one of the parts that enable the panel 110 to function as both a display panel and a touch-screen panel.

The plurality of common electrodes function as "common voltage electrodes" to which a common voltage Vcom is applied in a display mode, enabling the panel 110 to function as a display panel. In a touch mode, the plurality of common electrodes function as the "touch electrodes" to which a touch driving signal is applied, enabling the panel 110 to function as a touch screen.

In other words, when the driving mode of the display device is display mode, the common voltage Vcom is applied to the plurality of common electrodes. When the driving mode of the display device is a touch mode, a touch driving signal is applied to at least one of the plurality of common electrodes.

In the common electrodes, the term "common" indicates not only that the common voltage is applied to the common electrodes, but also that the common electrodes can function as both common voltage electrodes required for a display mode and touch electrodes required for a touch mode.

The in-cell touch display device 100 according to an exemplary embodiment may be an LCD or an OLED display.

A detailed description will be given below of the in-cell touchscreen panel 110 according to an exemplary embodiment.

Figure 2:
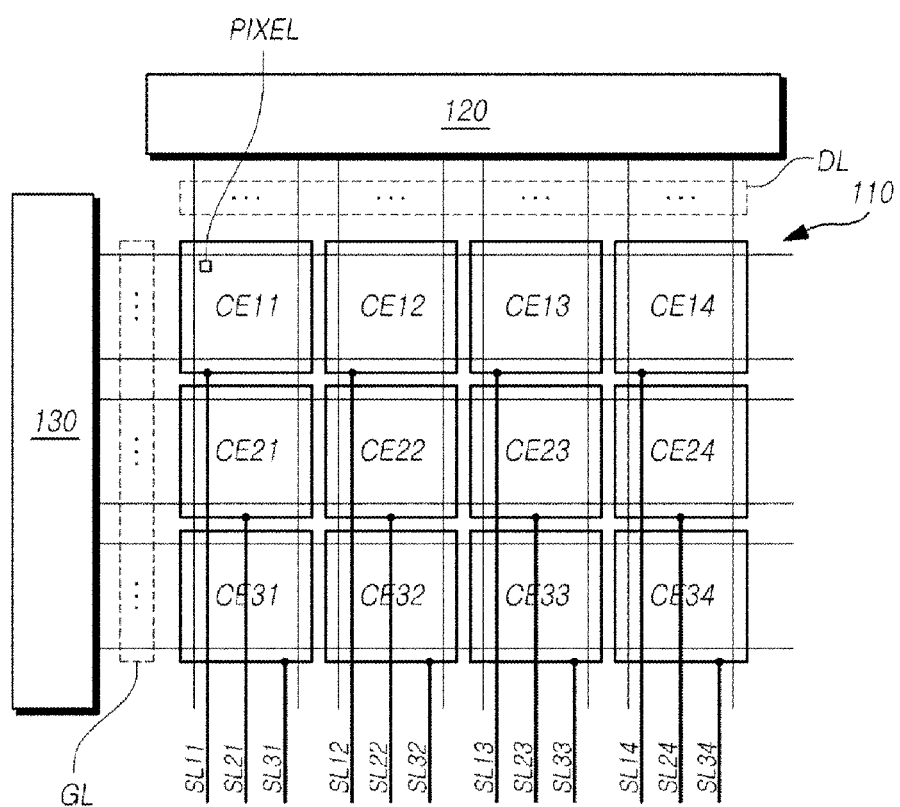
FIG. 2 illustrates the in-cell touchscreen panel illustrated in FIG. 1.

FIG. 2 illustrates the in-cell touchscreen panel 110 according to an exemplary embodiment.

Referring to FIG. 2, the in-cell touchscreen panel 110 according to an exemplary embodiment has the plurality of data lines DL and the plurality of gate lines GL formed thereon, with which the in-cell touchscreen panel 110 can function as a display panel.

Referring to FIG. 2, the in-cell touchscreen panel 110 according to an exemplary embodiment has the plurality of common electrodes formed thereon, with which the in-cell touchscreen panel 110 can function as both a display panel and a touchscreen panel. The plurality of common electrodes function as common voltage electrodes to which a common voltage is applied in a display mode and function as touch electrodes to which a touch driving signal is applied in a touch mode.

The in-cell touchscreen panel 110 illustrated in FIG. 2 has twelve common electrodes CE11, CE12, CE13, CE14, CE21, CE22, CE23, CE24, CE31, C332, CE33 and CE34 formed thereon.

Referring to FIG. 2, the size of each of the plurality of common electrodes CE11, CE12, CE13, CE14, CE21, CE22, CE23, CE24, CE31, C332, CE33 and CE34 corresponds to the size of a group of pixels.

In addition, referring to FIG. 2, each of the plurality of common electrodes CE11, CE12, CE13, CE14, CE21, CE22, CE23, CE24, CE31, C332, CE33 and CE34 is in the shape of, for example, a block. The blocks of the common electrodes are separated from each other.

In addition, depending on the driving mode, there is required a signal applying structure for applying a common voltage Vcom or a touch driving signal to each of the plurality of common electrodes CE11, CE12, CE13, CE14, CE21, CE22, CE23, CE24, CE31, C332, CE33 and CE34.

For this, as illustrated in FIG. 2, the in-cell touchscreen panel 110 according to an exemplary embodiment has signal lines formed thereon, the signal lines being respectively connected to the plurality of common electrodes corresponding to the touch electrodes.

That is, the number of the signal lines is the same as the number of the common electrodes corresponding to the touch electrodes.

Referring to FIG. 2, the signal lines are formed in the same direction as the data lines DL. Alternatively, the signal lines may be formed in the same direction as the gate lines GL.

Twelve signal lines SL11, SL12, SL13, SL14, SL21, SL22, SL23, SL24, SL31, SL32, SL33 and SL34 are formed on the in-cell touchscreen panel 110 according to an exemplary embodiment illustrated in FIG. 2.

Each of the signal lines transfers the common voltage to the connected common electrode in a display mode, and transfers a touch driving signal to the connected common electrode in a touch mode.

Figure 3:
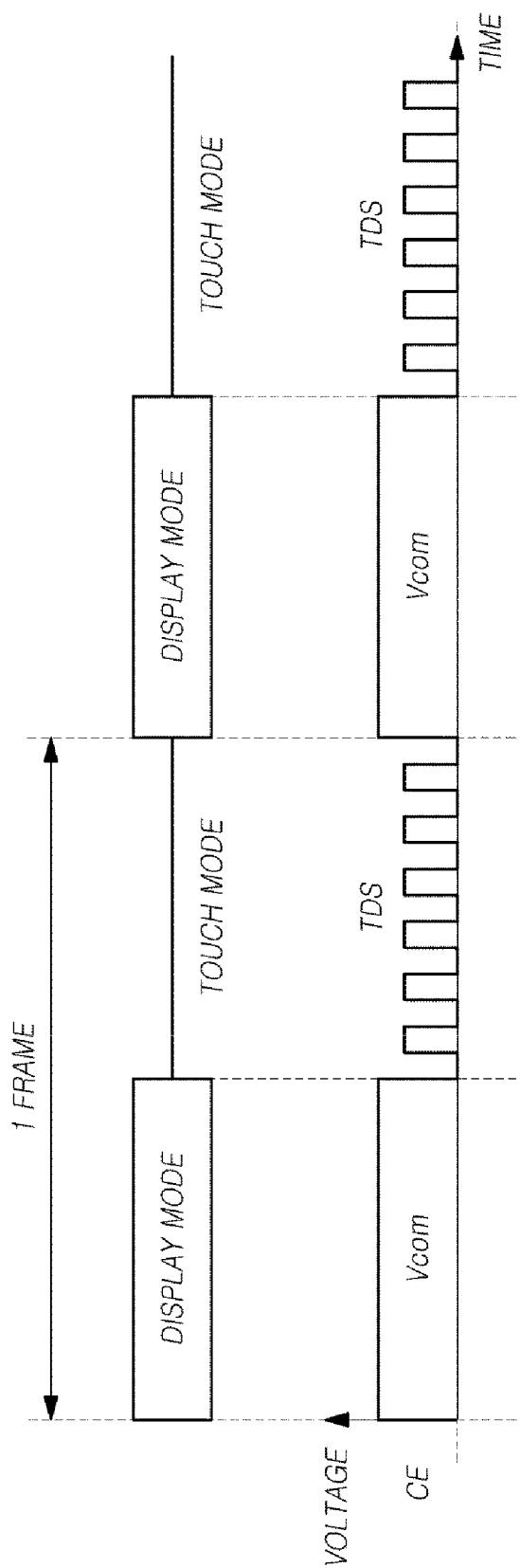
FIG. 3 conceptually illustrates a signal applied to a common electrode depending on the driving mode of the in-cell touch display device according to an exemplary embodiment of the present invention.

FIG. 3 conceptually illustrates a signal (Vcom or TDS) applied to a common electrode CE depending on the driving mode of the in-cell touch display device 100 according to an exemplary embodiment.

Referring to FIG. 3, the in-cell touch display device 100 according to an exemplary embodiment has two driving modes, i.e., a display mode and a touch mode.

Referring to FIG. 3, the driving mode of the in-cell touch display device 100 according to an exemplary embodiment can be divided into the display mode and the touch mode in one frame period through time division.

Referring to FIG. 3, in a display mode period in one frame period, a common voltage Vcom is applied to all of the plurality of common electrodes CE through all of the signal lines.

Referring to FIG. 3, in a touch mode period following the display mode period in one frame period, a touch driving signal TDS is sequentially applied to one of the plurality of common electrodes CE corresponding to the touch electrodes through a corresponding signal line.

When the touch driving signal TDS is applied to one common electrode, the touch driving signal TDS can be applied simultaneously to at least one adjacent common electrode.

As described above, in the touch mode period, a touch sensing operation is performed in response to the touch driving signal TDS being sequentially applied to the common electrodes CE corresponding to the touch electrodes.

In this regards, the in-cell touch display device 100 according to an exemplary embodiment can employ capacitive touch sensing technology for touch technology. The capacitive touch sensing technology allows for the detection of a touch, coordinates of a touched point and the like based on a change in capacitance through the plurality of common electrodes CE formed as touch electrodes on the panel 110 functioning as a touchscreen panel.

The capacitive touch sensing technology is divided, for example, into mutual capacitive touch sensing and self-capacitive touch sensing.

First, according to the mutual capacitive touch sensing that is one type of the capacitive touch sensing technology, among row electrodes (each of which may be referred to as a group of common electrodes arranged on a single row) and column electrodes (each of which may be referred to as a group of common electrodes arranged on a single column), electrodes arranged in a row (or in a column) function as transmitting (Tx) electrodes (also referred to as driving electrodes) to which a driving voltage (touch driving signal) is applied, and electrodes arranged in a column (or in a row)

function as receiving (Rx) electrodes (also referred to as sensing electrodes) that sense the driving voltage and generate capacitance (mutual capacitance) together with the Tx electrodes. A touch and coordinates of a touched point are detected based on a change in the capacitance (mutual capacitance) between the Tx and Rx electrodes depending on whether or not a pointer, such as a finger or a pen, is present.

In addition, according to the self-capacitive touch sensing that is another type of the capacitive touch sensing technology, the common electrodes CE functioning as touch electrodes generate capacitance (self-capacitance) with a pointer, such as a finger or a pen. Here, a capacitance value between a touch electrode and the pointer depending on whether or not the pointer is present is measured, and a touch and coordinates of a touched point are detected based on the measured capacitance value. Unlike from the mutual capacitive touch sensing, according to the self-capacitive touch sensing, a driving voltage (touch driving signal) is simultaneously applied and sensed through each of the common electrodes CE functioning as touch electrodes.

The in-cell touch display device 100 according to an exemplary embodiment can employ one of the above-mentioned two types of capacitive touch sensing (the mutual capacitive touch sensing and the self-capacitive touch sensing). However, it will be described herein on the assumption that the self-capacitive touch sensing is employed in this embodiment for the sake of explanation.

Figure 4:
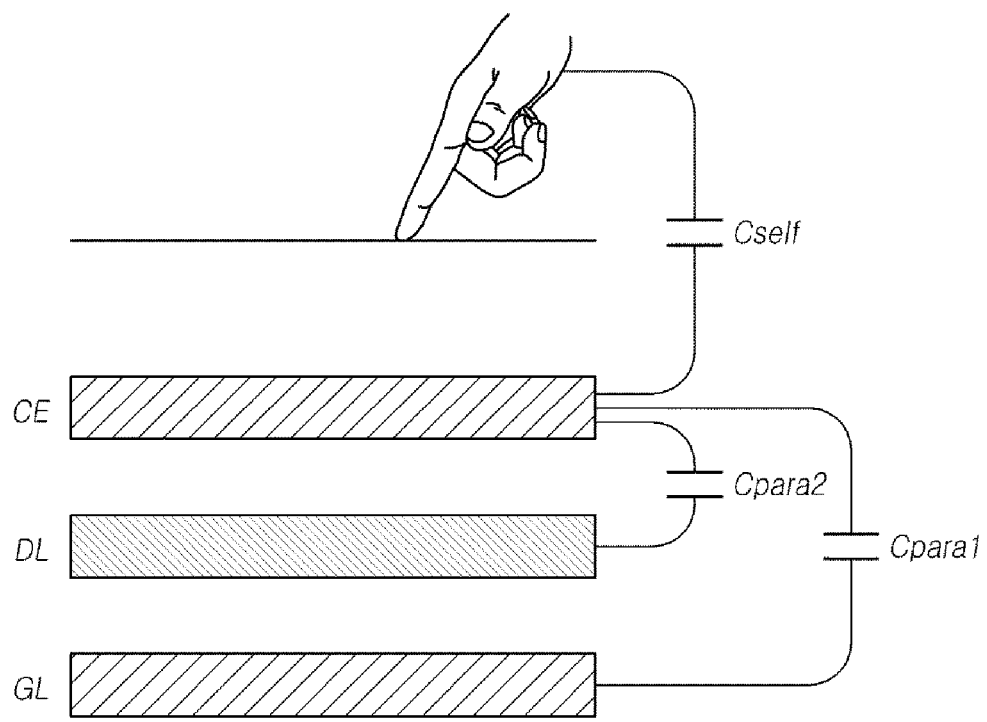
FIG. 4 illustrates capacitance components occurring in the in-cell touch display device according to an exemplary embodiment of the present invention.

FIG. 4 illustrates capacitance components occurring in the in-cell touch display device 100 according to an exemplary embodiment.

As described above, a common electrode CE is a common mode electrode that functions as a touch electrode to which a touch driving signal is applied in a touch mode and functions as a common voltage electrode to which a common voltage Vcom to be supplied to all pixels is applied in a display mode. Referring to FIG. 4, in the touch mode period, the common electrode CE generates capacitance Cself together with a pointer, such as a finger or a pen, in order to detect a touch and coordinates of a touched point. The common electrode CE may also generate undesirable parasitic capacitance components Cpara1 and Cpara2 together with a data line DL and a gate line GL.

The parasitic capacitances Cpara1 and Cpara2 undesirably occurring in the touch mode act as a significant load in a touch operation to lower the accuracy of touch sensing or disable the touch sensing.

The parasitic capacitance Cpara may cause worse problems in the touch sensing since the size thereof increases with the increasing size of the display device 100 or the display panel 110.

Therefore, the in-cell touch display device 100 according to an exemplary embodiment has a configuration devised to prevent the parasitic capacitance Cpara that would otherwise act as a significant load in the touch operation.

Figure 5:
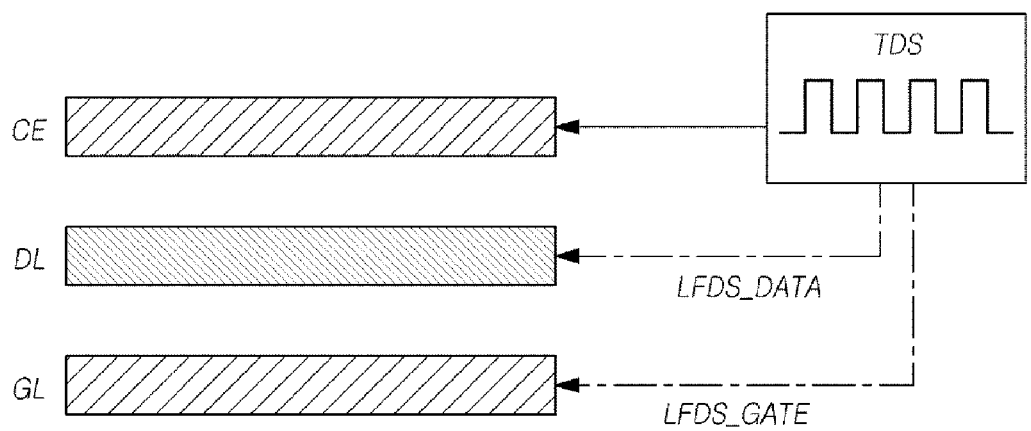
FIG. 5 conceptually illustrates an application of a signal to a data line and a gate line in order to prevent parasitic capacitance in the in-cell touch display device according to an exemplary embodiment of the present invention when the driving mode is touch mode.

FIG. 5 conceptually illustrates an application of a signal to a data line DL and a gate line GL in order to prevent parasitic capacitance Cpara in the in-cell touch display device 100 according to an exemplary embodiment when the driving mode is touch mode.

Referring to FIG. 5, when a touch driving signal TDS is applied to a common electrode CE corresponding to a touch electrode in a touch mode period, it is possible to prevent the parasitic capacitance Cpara from occurring between the common electrode CE and the gate line GL by removing the difference in the potential between the common electrode CE and the gate line GL.

Referring to FIG. 5, the gate driver 130 can output a load-free driving signal LFDS_gate to at least one gate line in order to remove the difference in the potential between the common electrode CE and the gate line GL. The load-free driving signal LFDS_gate corresponds to the touch driving signal TDS applied to the common electrode CE corresponding to the touch electrode.

The gate driver 130 can output the load-free driving signal LFDS_gate to all of the gate lines, or can output the load-free driving signal LFDS_gate to at least one gate line formed at a position corresponding to at least one common electrode CE to which the touch driving signal TDS is applied, i.e., a position in which the at least one gate line can form parasitic capacitance with the at least one common electrode CE to which the touch driving signal TDS is applied.

The load-free driving signal LFDS_gate output to the gate line GL can be, for example, a signal that is identical to the touch driving signal TDS.

For example, as illustrated in FIG. 5, when the touch driving signal TDS is a modulated signal in the form of a square wave alternating between a high level and a low level with a predetermined voltage width, the voltage width and phase of the load-free driving signal LFDS_gate output to the gate line GL may have may be the same as those of the touch driving signal TDS.

Likewise, referring to FIG. 5, when the touch driving signal TDS is applied to the common electrode CE corresponding to a touch electrode in the touch mode period, it is possible to prevent parasitic capacitance from occurring between the common electrode CE and the data line DL by removing the difference in the potential between the common electrode CE and the data line DL.

Referring to FIG. 5, in the touch mode, the data driver data driver 120 can output a load-free driving signal LFDS_data corresponding to the touch driving signal TDS to a plurality of data lines DL in order to remove the difference in the potential between the common electrode CE and the data line DL.

The data driver 120 can output the load-free driving signal LFDS_data to all of the data lines, or can output the load-free driving signal LFDS_data to at least one data line formed at a position corresponding to at least one common electrode CE to which the touch driving signal TDS is applied, i.e., a position in which the at least one data line can form parasitic capacitance with the at least one common electrode CE to which the touch driving signal TDS is applied.

The load-free driving signal LFDS_data output the data line DL can be, for example, a signal that is identical to the touch driving signal TDS applied to the common electrode CE.

For example, as illustrated in FIG. 5, when the touch driving signal TDS is a modulated signal in the form of a square wave alternating between a high level and a low level with a predetermined voltage width, the voltage width and phase of the load-free driving signal LFDS_data output to the data line DL may be the same as those of the touch driving signal TDS.

In addition, the load-free driving signal LFDS_gate output to the gate line GL may be identical to the load-free driving signal LFDS_data output to the data line DL.

In the in-cell touch display device 100 according to an exemplary embodiment, a load-free driving signal is divided into a load-free driving signal LFDS_data output to a data line and a load-free driving signal LFDS_gate output to a gate line. This signal is an additional signal that is intended to prevent parasitic capacitance, does not have an effect on either the touch sensing operation or the display operation, and corresponds to a touch driving signal TDS applied to the common electrodes CE functioning as touch electrodes.

Figure 6:
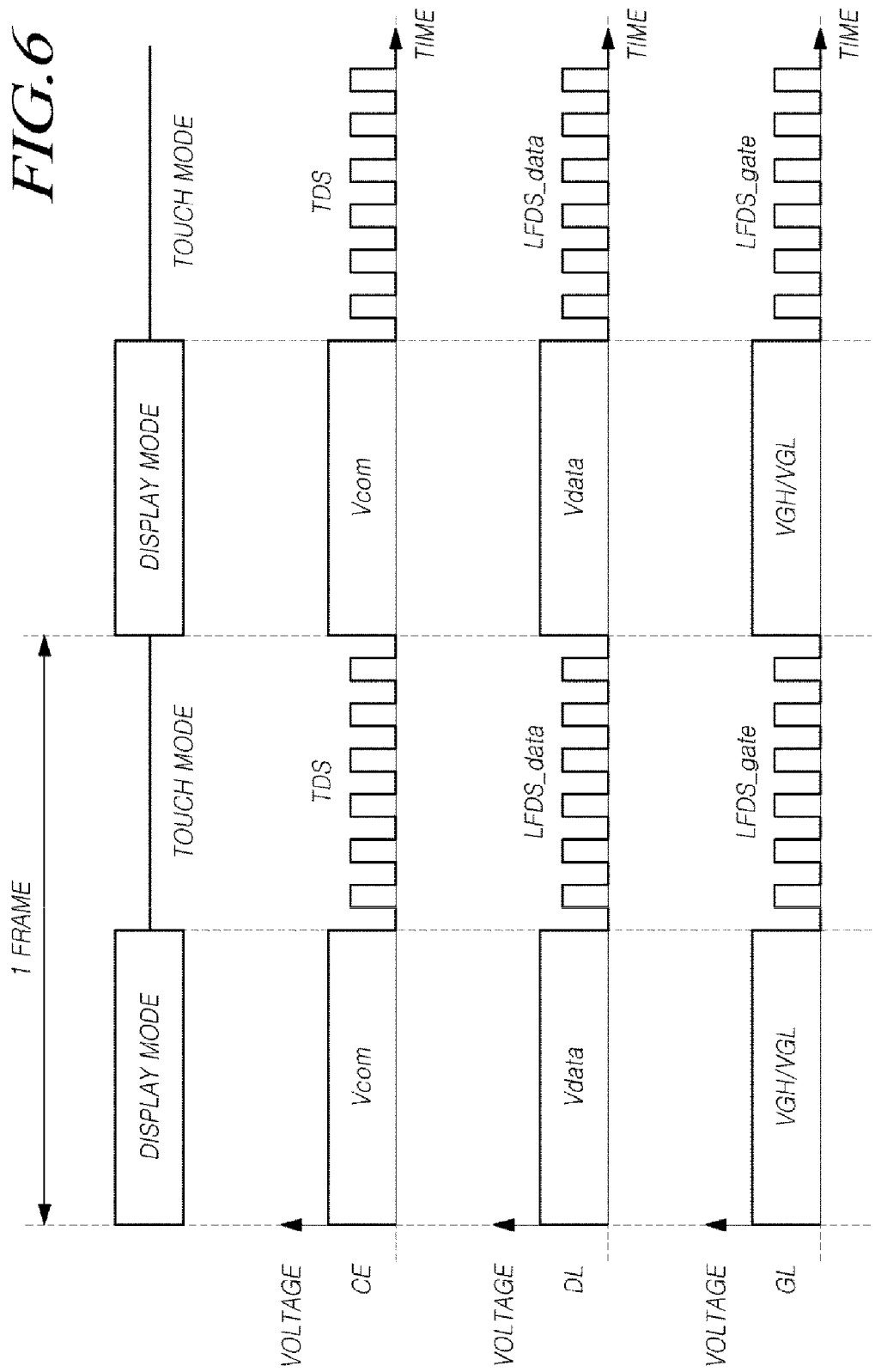
FIG. 6 conceptually illustrates a signal waveform applied to a common electrode, a data line and a gate line depending on the driving mode of the in-cell touch display device according to an exemplary embodiment of the present invention.

FIG. 6 conceptually illustrates a signal waveform applied to a common electrode CE, a data line DL and a gate line GL depending on the driving mode (i.e., a display mode and a touch mode) of the in-cell touch display device 100 according to an exemplary embodiment.

Referring to FIG. 6, when the driving mode is a display mode, the data driver 120 outputs a data voltage Vdata through the data line DL. The gate driver 130 outputs a scanning signal to the corresponding gate line GL. The scanning signal has a high-level voltage VGH present for one short period and a low-level voltage VGL present for the remaining long period during one frame period.

In addition, when the driving mode is the display mode, the common voltage Vcom supplied from a common voltage supply 720 (see FIG. 7) to be described later is applied to the plurality of common electrodes CE11, CE12, CE13, CE14, CE21, CE22, CE23, CE24, CE31, CE32, CE33 and CE34 (see FIG. 2) through the plurality of signal lines SL11, SL12, SL13, SL14, SL21, SL22, SL23, SL24, SL31, SL32, SL33 and SL34 (see FIG. 2).

The common voltage Vcom can be transferred from the common voltage supply 720 (see FIG. 7) to the data driver 120, from which the common voltage Vcom can be output to the plurality of signal lines SL11, SL12, SL13, SL14, SL21, SL22, SL23, SL24, SL31, SL32, SL33 and SL34. In some cases, the common voltage Vcom can be output from the common voltage supply 720 (see FIG. 7) to the plurality of signal lines SL11, SL12, SL13, SL14, SL21, SL22, SL23, SL24, SL31, SL32, SL33 and SL34 without passing through the data driver 120.

When the driving mode is a touch mode, the touch driving signal TDS is applied to at least one of the plurality of common electrodes CE11, CE12, CE13, CE14, CE21, CE22, CE23, CE24, CE31, CE32, CE33 and CE34 corresponding to the touch electrodes through at least one of the plurality of signal lines SL11, SL12, SL13, SL14, SL21, SL22, SL23, SL24, SL31, SL32, SL33 and SL34.

In an example, the touch driving signal TDS can be output to at least one of the plurality of signal lines SL11, SL12, SL13, SL14, SL21, SL22, SL23, SL24, SL31, SL32, SL33 and SL34 through the data driver 120 after being generated by a touch sensing unit 710 (see FIG. 7) to be described later.

In some cases, the touch driving signal TDS can be directly output to at least one of the plurality of signal lines SL11, SL12, SL13, SL14, SL21, SL22, SL23, SL24, SL31, SL32, SL33 and SL34 after being generated by the touch sensing unit 710 (see FIG. 7) to be described later.

When the driving mode is the touch mode, when the touch driving signal TDS is applied to at least one of the plurality of common electrodes CE11, CE12, CE13, CE14, CE21, CE22, CE23, CE24, CE31, CE32, CE33 and CE34 corresponding to touch electrodes through at least one of the plurality of signal lines SL11, SL12, SL13, SL14, SL21, SL22, SL23, SL24, SL31, SL32, SL33 and SL34, the data driver 120 can output the load-free driving signal LFDS_data corresponding to the touch driving signal TDS to the data line DL and the gate driver 130 can output the load-free driving signal LFDS_gate corresponding to the touch driving signal TDS to the gate line GL.

Figure 7:
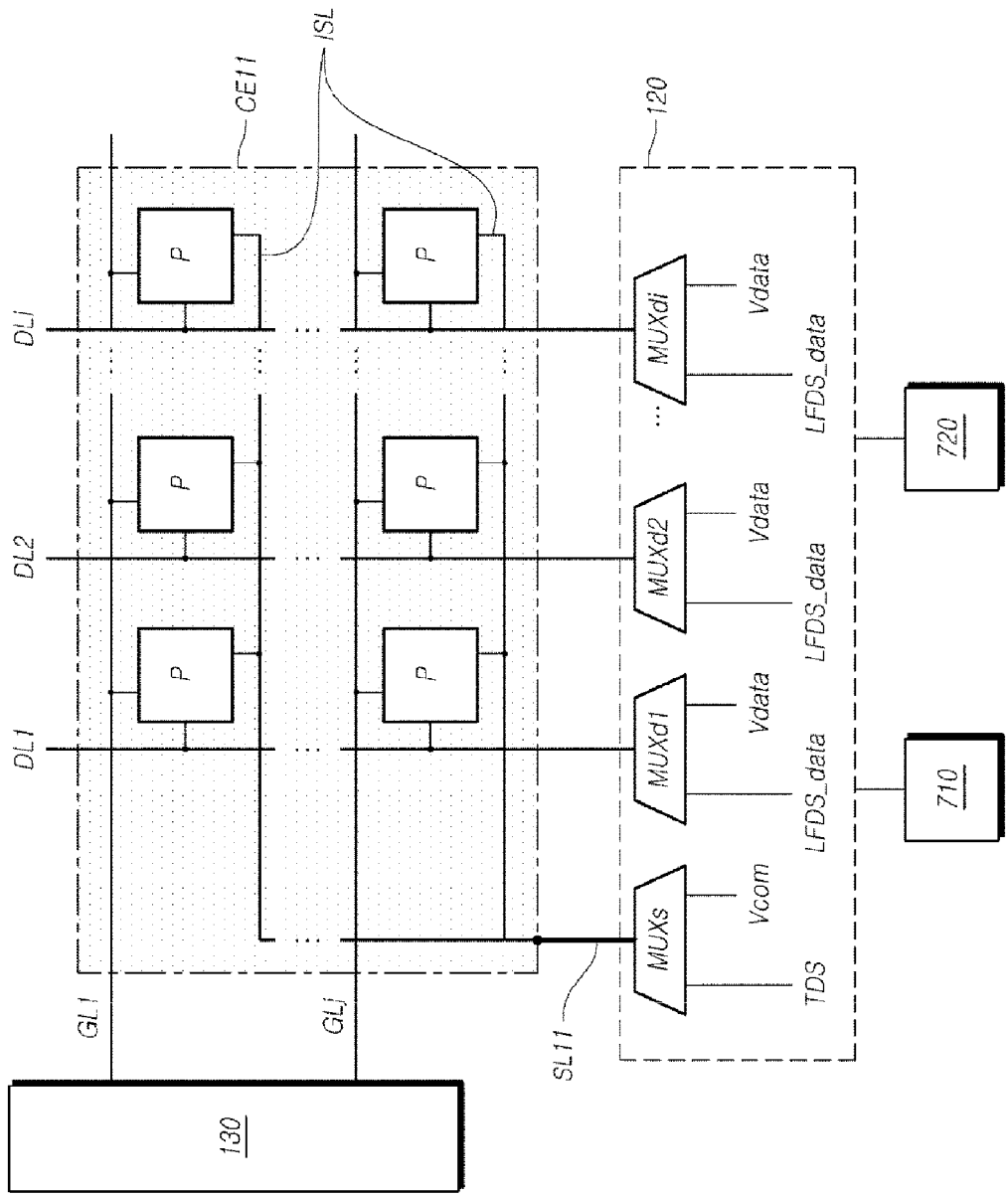
FIG. 7 illustrates a signal applying structure in a unit touch area of the in-cell touch display device according to an exemplary embodiment of the present invention.

FIG. 7 illustrates a signal applying structure in a unit touch area of the in-cell touch display device 100 according to an exemplary embodiment.

First, referring to FIG. 7, the in-cell touch display device 100 according to an exemplary embodiment includes the touch sensing unit 710 and the common voltage supply 720. The touch sensing unit 710 measures a change in capacitance in one common electrode of the plurality of common electrodes CE, i.e., at least one touch electrode, to which a touch driving signal TDS is applied, such that a touch and coordinates of a touched point are detected based on the change in capacitance. The common voltage supply 720 supplies a common voltage Vcom to be applied to all of the plurality of common electrodes CE.

As illustrated in FIG. 7, the touch sensing unit 710 may be separately provided outside the data driver 120, or in some cases, may be provided inside the data driver 120.

In this regard, the data driver 120 may be implemented as at least one data driver integrated circuit (DDIC) (also referred to as a "source driver integrated circuit (SDIC)"). The touch sensing unit 710 may be provided as a separate touch integrate circuit (IC) outside the DDIC. Alternatively, at least one touch sensing unit 710 may be provided inside the DDIC, thereby forming a one-chip structure.

FIG. 7 illustrates the signal applying structure in the unit touch area in which one common electrode CE11 is formed. The common electrode CE11 is positioned on the first column and the first row of the plurality of common electrodes CE11, CE12, CE13, CE14, CE21, CE22, CE23, CE24, CE31, CE32, CE33 and CE34.

Referring to FIG. 7, an i number of data lines DL1 to DLi (i=1, 2, . . . ) and a j number of gate lines GL1 to GLj (j=1, 2, . . . ) are formed in the unit common electrode area in which one common electrode CE11 is formed.

In addition, referring to FIG. 7, for example, an i*j number of pixels P are defined at points in which the i number of data lines DL1 to DLi (i=1, 2, . . . ) and the j number of gate lines GL1 to GLj (j=1, 2, . . . ) intersect each other in the unit common electrode area in which one common electrode CE11 is formed.

Referring to FIG. 7, one data line and one gate line are connected to each of the i*j number of pixels P formed in the unit common electrode area in which one common electrode CE11 is formed. In addition, an inner signal line ISL through which the common voltage Vcom is transferred is connected to each of the i*j number of pixels P.

Here, the inner signal line ISL is a signal line separate from the signal line SL11 through which one common electrode CE11 is connected to the data driver 120, and through which the common voltage Vcom or the touch driving signal TDS is transferred. The inner signal line ISL is formed inside the unit common electrode area, connected to the signal line SL11.

First, a description will be given of the application (supply) of a variety of signals (a data voltage, a scanning signal and a common voltage) when the driving mode is display mode.

Referring to FIG. 7, when the driving mode is the display mode, the data driver 120 supplies a corresponding data voltage Vdata (also referred to as a "pixel voltage") to the i number of data lines DL1 to DLi through an i number of data line multiplexers MUXd1 to MUXdi.

Referring to FIG. 7, when the driving mode is the display mode, the gate driver 130 sequentially operates the j number of gate lines GL1 to GLj by supplying a turn-on voltage level scanning signal (e.g., VGH) to one gate line of the j number of gate lines GL1 to GLj and a turn-off voltage level scanning signal (e.g., VGL) to the other gate lines of the j number of gate lines GL1 to GLj.

Referring to FIG. 7, when the driving mode is the display mode, the common voltage supply 720 outputs the common voltage Vcom to the signal line SL11 and the inner signal line ISL through, for example, a common electrode multiplexer MUXs of the data driver 120, thereby applying the common voltage Vcom to the common electrode CE11 corresponding to the unit common electrode area. The common voltage Vcom is applied to all of the common electrodes CE11, CE12, CE13, CE14, CE21, CE22, CE23, CE24, CE31, CE32, CE33 and CE34.

Subsequently, a description will be given of the application (supply) of a signal when the driving mode is a touch mode.

Referring to FIG. 7, when the driving mode is the touch mode, for example, the touch sensing unit 710 supplies the touch driving signal TDS to the common electrode CE11 corresponding to the unit common electrode area, as required, through the common multiplexer MUXs of the data driver 120.

In addition, referring to FIG. 7, when the driving mode is the touch mode, for example, the sensing unit 710 and the gate driver 130 apply a load-free driving signal LFDS_gate, the phase and voltage width of which correspond to those of the touch driving signal TDS, to the j number of gate lines GL1 to GLj as required.

Referring to FIG. 7, when the driving mode is the touch mode, for example, the touch sensing unit 710 applies a load-free driving signal LFDS_data to the i number of data lines DL1 to DLi through the i number of data line multiplexers MUXd1 to MUXdi of the data driver 120 as required. The phase and voltage width of the load-free driving signal LFDS_data correspond to those of the touch driving signal TDS.

In addition, the i number of data line multiplexers MUXd1 to MUXdi illustrated in FIG. 7 may be implemented as a single data line multiplexer.

The structure and method enabling the gate driver 130 to output the scanning signal or the load-free driving signal LFDS_gate to the gate line in FIG. 7 will be described in greater detail with reference to FIG. 8.

Figure 8:
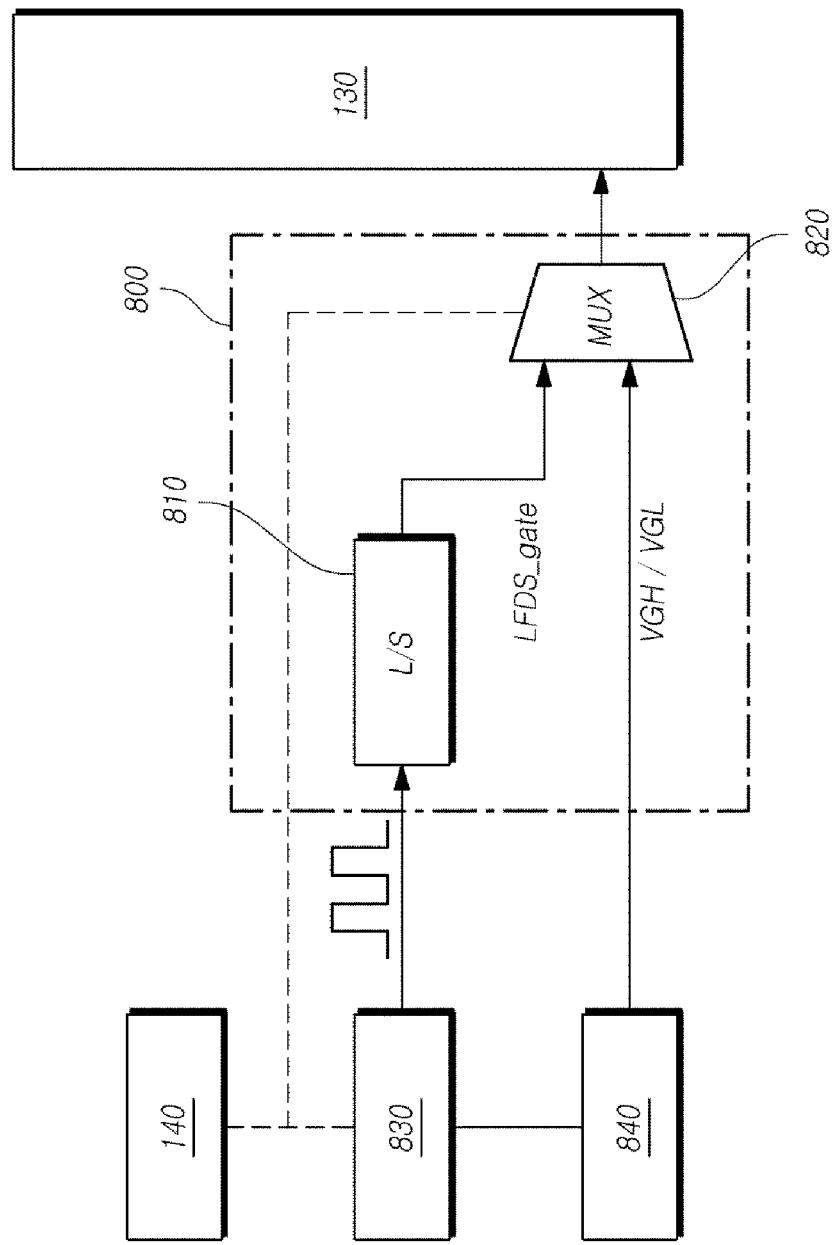
FIG. 8 conceptually illustrates a circuit in which the gate driver outputs a scanning signal or a load-free driving signal depending on the driving mode of the in-cell touch display device according to an exemplary embodiment of the present invention.

FIG. 8 conceptually illustrates a circuit in which the gate driver 130 outputs a scanning signal or a load-free driving signal LFDS_gate depending on the driving mode of the in-cell touch display device 100 according to an exemplary embodiment.

Referring to FIG. 8, the gate driver 130 of the in-cell touch display device 100 according to an exemplary embodiment outputs a scanning signal to a corresponding gate line GL in a display mode, and outputs a load-free driving signal LFDS_gate corresponding to a touch driving signal TDS to a corresponding gate line GL in a touch mode.

Referring to FIG. 8, the in-cell touch display device 100 according to an exemplary embodiment further includes a circuit 800 enabling the gate driver 130 to selectively output one of the scanning signal VGG/VGL and the load-free driving signal LFDS_gate to the gate line.

Referring to FIG. 8, the circuit 800 includes a level shifter (L/S) 810 and a multiplexer 820. The level shifter 810 generates the load-free driving signal LFDS_gate corresponding to the touch driving signal based on an input timing signal. The multiplexer 820 selectively outputs one of the input scanning voltage VGG/VGL and the input load-free driving signal LFDS_gate to the gate driver 130.

The timing signal is a type of clock signal required for the level shifter 810 to generate the load-free driving signal LFDS_gate corresponding to the touch driving signal.

Referring to FIG. 8, for example, the level shifter 810 can modulate a scanning voltage (e.g., a low level scanning voltage VGL) in synchronization with the touch driving signal based on the input timing signal, thereby generating the load-free driving signal LFDS_gate corresponding to the touch driving signal.

In addition, referring to FIG. 8, the in-cell touch display device 100 according to an exemplary embodiment further includes a micro control unit (MCU) 830 that outputs the timing signal required for the generation of the load-free driving signal LFDS_gate to the level shifter 810.

The micro control unit 830 can have a touch enable signal input thereto from the timing controller 140, and can output the input touch-enable signal to the multiplexer 820.

The multiplexer 820 can selectively output one of the scanning voltage VGG/VGL and the load-free driving signal LFDS_gate to the gate driver 130 based on the touch enable signal input from the timing controller 140 or the micro control unit 830. Accordingly, the gate driver 130 generates a scanning voltage according to whether a scanning signal is a high-level voltage VGH or a low-level voltage VGL and subsequently outputs the generated scanning voltage to the gate line, or outputs the load-free driving signal LFDS_gate to the gate line.

The touch enable signal may vary depending on the driving mode.

For example, when the driving mode is display mode, the touch enable signal may be a low-level signal. When the driving mode is touch mode, the touch enable signal may be a high-level signal The touch enable signal enables the level shifter 810 and the multiplexer 820 to recognize whether the current point of time of the operation is in the display mode period or the touch mode period.

The micro control unit 830 may be provided outside or inside the data driver 120.

Specifically, the micro control unit 830 may be provided separate from the DDIC of the data driver 120 or may be implemented as an internal unit of the DDIC of the data driver 120.

Referring to FIG. 8, the in-cell touch display device 100 according to an exemplary embodiment further includes a power management integrated circuit 840 that outputs the scanning voltage VGH/VGL to the multiplexer 820.

The power management integrated circuit 840 may be provided outside or inside the data driver 120.

Specifically, the power management integrated circuit 840 may be provided as a unit separate from the DDIC of the data driver 120 or may be implemented as an internal unit included inside the DDIC of the data driver 120.

As illustrated in FIG. 8, the circuit 800 may be provided as a separate unit outside the gate driver 130. In this case, it is possible to realize the function of the gate driver 130 that selectively outputs one of the scanning signal VGH/VGL and the load-free driving signal LFDS_gate to the gate line without changing the design of any of the gate driver 130, the timing controller 140, the micro control unit 830 and the power management integrated circuit 840.

The circuit 800 may be, of course, provided as an internal unit of the gate driver 130.

In addition, the circuit 800 may be disposed on a source printed circuit board (PCB) on which the data driver 120 may be disposed, may be disposed on a control PCB on which the timing controller 140 may be disposed, or in some cases, may be provided as a chip disposed on the panel 110.

In the in-cell touch display device 100 according to an exemplary embodiment, the timing controller 140 may be provided as a part separate from either the data driver 120 or the gate driver 130. Alternatively, in some cases, the timing controller 140 may be provided inside the data driver 120, i.e., the DDIC of the data driver 120.

According to one or more embodiments of the present invention as set forth above, the in-cell touch display device 100 can prevent parasitic capacitance that would otherwise increase the load of the touch operation, lower the accuracy of the touch sensing, or make the touch sensing impossible.

According to one or more embodiments of the present invention, the in-cell touch display device 100 provides an efficient gate line driving system that can prevent parasitic capacitance.

According to one or more embodiments of the present invention, the in-cell touch display device 100 can prevent parasitic capacitance without a change in the design of existing parts, such as the gate driver 130 and the power management integrated circuit 840.

The foregoing descriptions and the accompanying drawings have been presented in order to explain the certain principles of one or more embodiments of the present invention. A person skilled in the art to which the invention relates can make many modifications and variations by combining, dividing, substituting for or changing elements without departing from the principle of one or more embodiments of the invention. The foregoing embodiments disclosed herein shall be interpreted as illustrative only not as limitative of the principle and scope of the invention. It should be understood that the scope of the invention shall be defined by the appended Claims and all of their equivalents fall within the scope of the invention.

What is claimed is:

1. An in-cell touch display device comprising:
    a panel including a plurality of data lines, a plurality of gate lines, a plurality of pixels located at intersections of the gate lines and the data lines, and a plurality of touch electrodes disposed thereon, wherein a touch driving signal is applied to the plurality of touch electrodes when a driving mode is a touch mode;
    a data driver configured to drive the plurality of data lines;
    a gate driver configured to drive the plurality of gate lines, wherein the gate driver sequentially outputs a scanning signal to the plurality of gate lines when the driving mode is a display mode, and outputs a load-free driving signal having same phase as the touch driving signal to at least one gate line of the plurality of gate lines when the driving mode is the touch mode;
    a level shifter configured to generate the load-free driving signal; and
    a multiplexer configured to input a scanning voltage or the load-free driving signal to the gate driver depending on the driving mode.

2. The in-cell touch display device according to claim 1, wherein the plurality of touch electrodes are in shape of blocks separated from each other.

3. The in-cell touch display device according to claim 1, wherein the plurality of touch electrodes include a plurality of touch mode electrodes to which the touch driving signal is applied only in the touch mode, or a plurality of common mode electrodes to which a display driving signal is applied in the display mode and the touch driving signal is applied in the touch mode.

4. The in-cell touch display device according to claim 3, wherein, when the plurality of touch electrodes are the common mode electrodes, a plurality of common electrodes formed as blocks on the panel for displaying an image function as the plurality of touch electrodes,
    wherein a common voltage is applied as the display driving signal to the plurality of touch electrodes corresponding to the plurality of common electrodes formed as the blocks on the panel when the driving mode is the display mode, and the touch driving signal is applied to at least one touch electrode of the plurality of touch electrodes when the driving mode is the touch mode.

5. The in-cell touch display device according to claim 4, wherein signal lines are disposed on the panel, each of the signal lines being connected to a corresponding touch electrode of the plurality of touch electrodes,
    wherein the plurality of signal lines transfer the common voltage to the touch electrodes connected thereto in the display mode, and transfer the touch driving signal to the touch electrodes connected thereto in the touch mode.

6. The in-cell touch display device according to claim 1, wherein, in the touch mode, the gate driver outputs the load-free driving signal corresponding to the touch driving signal to all of the plurality of gate lines, or outputs the load-free driving signal corresponding to the touch driving signal to at least one gate line of the plurality of gate lines formed at a position in which the at least one gate line is to form parasitic capacitance with at least one touch electrode of the plurality of touch electrodes to which the touch driving signal.

7. The in-cell touch display device according to claim 1, wherein, in the touch mode, the data driver outputs the load-free driving signal corresponding to the touch driving signal to all of the plurality of data lines, or outputs the load-free driving signal corresponding to the touch driving signal to at least one data line of the plurality of data lines formed at a position in which the at least one data line is to form parasitic capacitance with at least one touch electrode of the plurality of touch electrodes to which the touch driving signal is applied.

8. The in-cell touch display device according to claim 1, wherein the level shifter generates the load-free driving signal corresponding to the touch driving signal by modulating the scanning voltage in synchronization with the touch driving signal based on an input timing signal.

9. The in-cell touch display device according to claim 8, further comprising a micro control unit configured to output the timing signal used for generation of the load-free driving signal to the level shifter.

10. The in-cell touch display device according to claim 9, wherein the micro control unit has a touch enable signal input thereto from a timing controller controlling the data driver and the gate driver, and outputs the input touch-enable signal to the multiplexer.

11. The in-cell touch display device according to claim 10, wherein the multiplexer selectively outputs one of the scanning voltage and the load-free driving signal to the gate driver based on the touch enable signal input from the timing controller or the micro control unit.

12. The in-cell touch display device according to claim 9, wherein the micro control unit is provided inside or outside the data driver.

13. The in-cell touch display device according to claim 1, further comprising a power management integrated circuit configured to output the scanning voltage to the multiplexer.

14. The in-cell touch display device according to claim 13, wherein the power management integrated circuit is provided inside or outside the data driver.

15. The in-cell touch display device according to claim 1, further comprising a timing controller configured to control the data driver and the gate driver, wherein the timing controller is provided inside or outside the data driver.

16. The in-cell touch display device according to claim 1, further comprising a touch sensing unit configured to measure a change in capacitance of at least one common electrode of the plurality of common electrodes to which the touch driving signal is applied, a touch and coordinates of a touched point being detected based on the change in capacitance.

17. The in-cell touch display device according to claim 16, wherein the touch sensing unit is provided inside or outside the data driver.

* * * * *